Sept. 30, 1969  A. J. SILVERMAN ET AL  3,470,509

ELECTROMAGNETIC ROTARY INDICATING DEVICE

Filed Aug. 17, 1967  2 Sheets-Sheet 1

INVENTORS.
ALVIN J. SILVERMAN
ALBERT DIAMOND

ATTORNEY

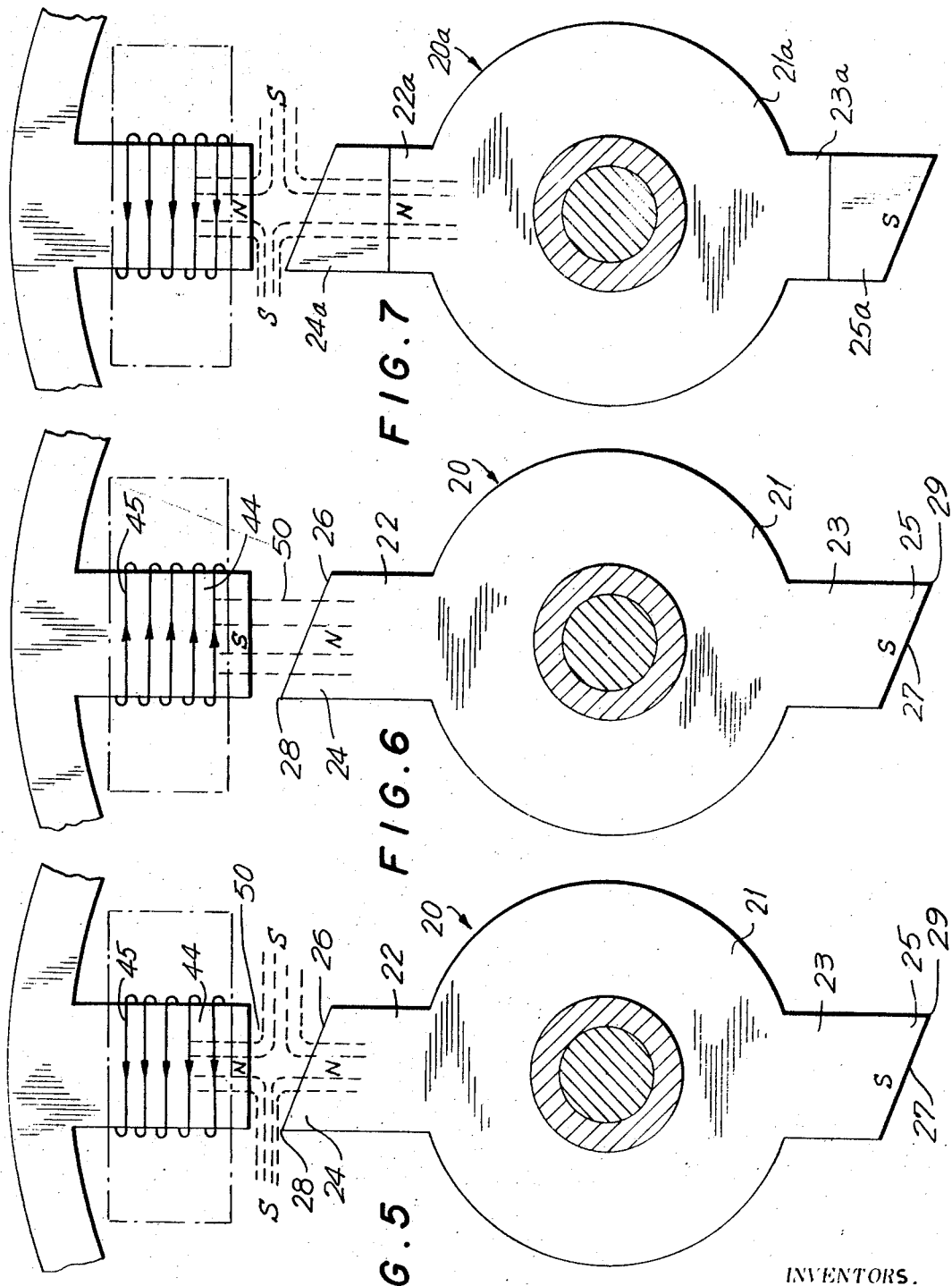

United States Patent Office 3,470,509
Patented Sept. 30, 1969

3,470,509
ELECTROMAGNETIC ROTARY INDICATING DEVICE
Alvin J. Silverman, Massapequa, and Albert Diamond, Plainview, N.Y., assignors to Vernitron Corporation, Farmingdale, N.Y., a corporation of New York
Filed Aug. 17, 1967, Ser. No. 661,303
Int. Cl. H01f 7/08, 7/18
U.S. Cl. 335—229                             8 Claims

ABSTRACT OF THE DISCLOSURE

An indicating device including an electromagnetically operated rotor wherein asymmetric magnetic formations are provided which do not adversely affect the desired alignment of poles, and permit 180-degree rotor rotation by the formation of an asymmetric magnetic field upon repelling energization of a coil.

BACKGROUND OF THE INVENTION

As is well known to those versed in the art of electromagnetic rotary indicators, difficulty has been experienced in efficiently effecting 180-degre rotor rotation when reversing the main field. Prior proposals toward this end have involved the detenting (the magnetic holding of a rotor in position in the absence of power) in a slightly angularly offset or out-of-line relation with its adjacent salient pole. This mode of construction and operation produced an annoying and distracting rotor vibration, oscillation or dither, especially when employed with pulsed or intermittent power.

SUMMARY

According, it is in an important object of the present invention to provide an extremely simple construction in an electromagnetic rotary indicator which quickly and economically produces rotor rotation to any selected position without apparent dither, and wherein 180-degree rotor rotation may be readily accomplished by mere reversal of the main field.

It is a further object of the present invention to provide an electromagnetic rotary indicating device having the advantageous characteristics mentioned in the preceding paragraph, which is extremely simple, durable and reliable in construction and operation, and which can be economicaly manufactured for sale at a reasonable price.

Other objects of the present invention will become apparent upon reading the following specification and referring to the accompanying drawing, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIGURE 5 is an enlarged diagrammatic representation of an aligned salient stator pole and rotor of the present invention, illustrating magnetic lines of force produced by repelling energization of the stator-pole coil;
FIGURE 6 is a view similar to FIGURE 5, but illustrating the magnetic field produced by attracting energization of the stator-pole coil;
and
FIGURE 7 is a view similar tio FIGURE 5, but showing a slightly modified embodiment of rotor.

DECRIPTION OF THE PREFERRED EMBODIMENT

Figure 1:
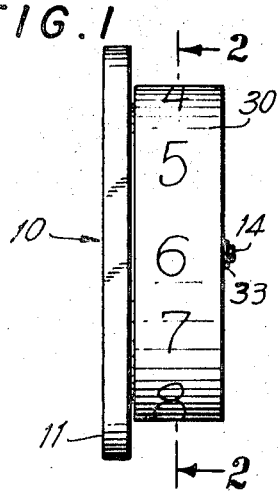
FIGURE 1 is a front elevational view showing an indicating device constructed in accordance with the teachings of the present invention.
Figure 2:
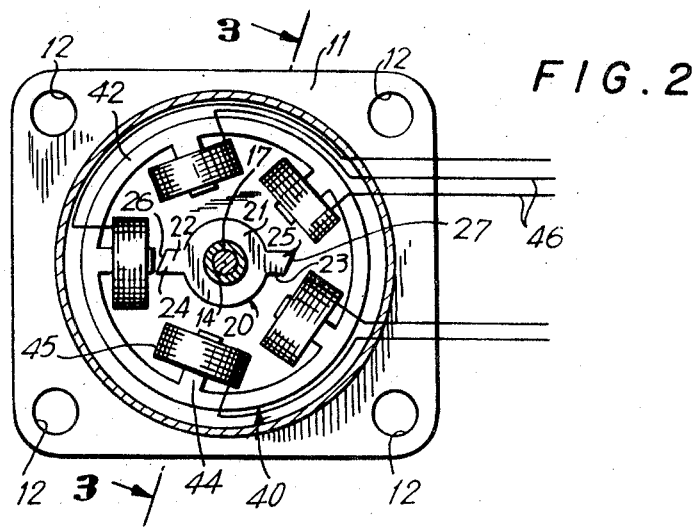
FIGURE 2 is a sectional elevational view taken generally along the line 2—2 of FIGURE 1.
Figure 3:
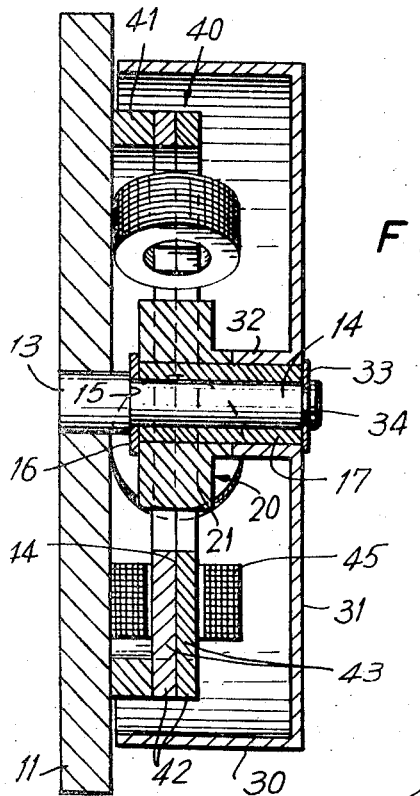
FIGURE 3 is a transverse sectional view taken generally along the line 3—3 of FIGURE 2.
Figure 4:
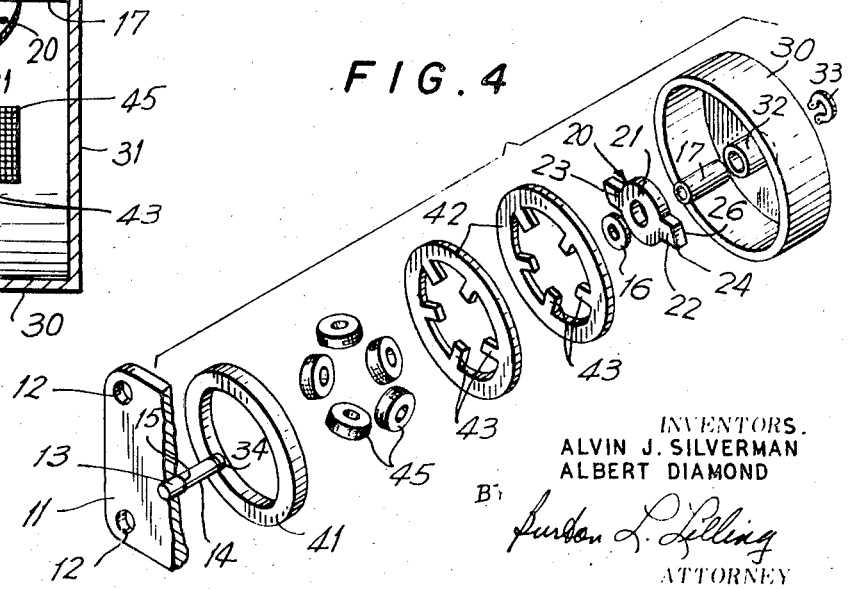
FIGURE 4 is an exploded perspective view of the indicating device of FIGURES 1–3.

Referring now more particulary to the drawing, and specifically to FIGURES 1–4 thereof, an indicating device of the present invention is there generally designated 10, and may include a generally rectangular mounting plate 11 provided with a rectangular array of thru holes 12, as for receiving mounting fasteners. Centrally of the rectangular array of apertures 12, a stub shaft 13 projects from one face of the plate 11, and has its outer portion reduced, as at 14, defining an outwardly facing circumeferential shoulder 15 intermediate the shaft ends.

An annular shim, washer or collar 16 is circumposed about the shaft portion 14, against the shoulder 15, and a bearing or tube 17 extends rotatably about the shaft portion 14 having one end adjacent to the washer 16. A rotor is generally designated 20, and is circumposed about the bearing 17 for free rotation about the shaft 13, say by force fit on the bearing 17. The rotor 20 is best seen in FIGURES 2, 4, 5 and 6, and is advantageously fabricated of magnetically hard material, including an annular portion or hub 21 circumposed about the bearing 17, and a pair of diametrically opposed radially outwardly projecting extensions or poles 22 and 23. The poles or extensions 22 and 23 may be of a depth or thickness substantially equal to that of the hub 21, and of generally rectangular transverse cross section, having their respective end portions 24 and 25 of a radially asymmetric configuration. More specifically, in the illustrated embodiment, the pole end portions 24 and 25 are each of a triangular or wedge-shaped configuration, terminating in respective end surfaces 26 and 27 disposed in parallelism with each other oblique to the radii or common diameter of the poles. By this wedge-shaped configuration, the poles 22 and 23, and more specifically their end portions 24 and 25 taper outwardly, with their distal regions or remote corners 28 and 29 located in diagonally opposed relationship. Thus, while the permanent-magnet poles 22 and 23 are of asymmetric magnetic formation, their physical configuration is such as to permit relative balance of the rotor 20.

Spacedly surrounding and concentric with the rotor 20 and shaft 13, is an outer cylindrical member or drum 30, which may be provided with suitable indicia, as desired, say numerical indicia as illustrated in FIGURE 1 or other. The cylinder or drum 30 may include an outer end wall 31 extending from the outer end of the drum radially inward to the journal bearing 17, where it is provided with an inturned tubular extension 32 fixedly circumposed about the bearing 17 and terminating contiguous to the rotor 20. A retaining ring 33 may be snap-engaged about the free-end region of shaft 13, say in a shaft groove 34, for retaining the assembled bearing 17, rotor 20 and drum part 32 in position, while permitting unitary rotation of the same.

Spacedly circumposed about the rotor 20, and interiorly within the drum 30, there is fixedly mounted on the plate 11 a stator, generally designated 40. The stator may include a mounting ring or spacing annulus 41 concentrically circumposed about the shaft 13 and suitably fixed with one side in facing engagement with the plate 11. A plurality of annular, magnetically soft plates or laminations 42 are stacked in facing engagement with each other and suitably secured in generally congruent relation to the ring 41, spacedly surrounding the rotor 20 within the drum 30. The laminations of annular plates 42 are advantageously each provided with a plurality of radially inwardly projecting extensions, also advantageously of magnetically soft material, which extensions are in respective facing overlying engagement with each other, so that each group of overlying extensions 43 defines a radially inwardly projecting tooth 44.

That is, the teeth 44 are located in an annular array about the rotor 20, extending radially inwardly toward and terminating short of the arc of rotation of the rotor. The teeth 44 may have their free, distal or inner ends generally flat or square, so as to be tangent to the arc of rotor rotation. While an odd number of teeth 44 is illustrated and described, specifically five in number, it is appreciated that the number may be greater or less, and even as well as odd. However, an odd number is advantageous as being capable of affording double the tooth number of rotor positions, as will presently become apparent.

Circumposed about the several teeth 44 are respective electrically conductive coils 45, each of which may be selectively energizable, and further selectively energizable in a desired direction for obtaining a particular polarity. The coils 45 are provided with respective conductive leads 46 for connection to the source of electrical supply, as through suitable switching means of any desired arrangement.

As best seen in FIGURE 6, a stator coil 45 is electrically energized by passage of current in one direction through coil 45 to produce a salient pole of south polarity. This has attracted the permanent-magnet pole 22 of north polarity into substantial alignment with the south stator pole. The configuration of magnetic lines of force produced by the energized south salient pole 44 is substantially symmetrical therewith and passes through the attracted north permanent-magnet pole 22 in symmetry with the latter. Particularly is this so when the cross-sectional configurations of the aligned poles 44 and 22 are substantially identical, as in the illustrated embodiment. That the air gap 50 between the substantially aligned poles 44 and 22 is of a laterally varying or changing dimension does not adversely affect the alignment of the attracting poles, as effectively all of the flux extends longitudinally of the poles. Upon removal of energization from coil 45 in FIGURE 6, residual flux passes in the same pattern or configuration as illustrated, so that the detent or holding position of rotor 20 in the absence of power remains, to all appearances, the same as that under power. This results in apparent absence of oscillation, vibration and dither, even under the conditions of pulsed power.

Upon reversal of power through coil 45, as in FIGURE 5, the permanent-magnet pole 22 and the aligned stator pole 44 are in magnetic opposition, or like and repelling, both being north in the illustration. Consequently, there are formed a pair of opposed south poles in spaced quadrature. However, by the asymmetric magnetic formation of the pole end portion 24, which defines the air gap 50 of different dimensions at opposite sides of the gap, the consequent south poles are of different strength or flux density and therefore exert a net force in one direction tangential to the arc of rotor rotation. This net tangential force is sufficient to effect incipient rotation of the rotor 20, after which the repelling magnetic force is continued to complete 180-degree rotor rotation.

In the embodiment of FIGURE 7, a rotor 20a is similar to the first-described rotor 20, including a hub 21a permanently magnetized of magnetically hard material and having diametrically oppositely extending poles 22a and 23a. However, the end portions 24a and 25a of respective poles 22a and 23a may be fabricated of magnetically soft material, deriving their magnetism from that of the contiguous magnetically hard material. The foregoing description of operation is believed applicable with equal force to operation of the embodiment of FIGURE 7.

From the foregoing, it is seen that the present invention provides an electromechanical indicating device which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claim is:

1. In an indicating device the combination comprising,
   a stator having at least one tooth,
   an electrically energizable coil circumposed about said tooth and adapted when selectively enregized to produce a salient pole of a selected polarity,
   a rotor, rotatable centrally of said stator and having oppositely extending magnetic poles with each pole having a different polarity whereby a magnetic pole of said rotor having a polarity opposite said selected polarity of said salient pole will be attached thereto and thereby cause said rotor to rotate until said attracted pole of said rotor is alinged with said stator salient pole, and
   an asymmetric magnetic formation on each of said rotor magnetic poles adapted to permit an attracted rotor pole to remain aligned with said salient pole after said coil is de-energized and to produce incipient rotation of said rotor in the direction of the asymmetry of said asymmetric formation upon energization of said salient pole with the same polarity as that of said aligned rotor pole.

2. The device according to claim 1, wherein said magnetic formation comprises a pole-end formation defining in the space between a substantially aligned pair of salient and magnetic poles an air gap of asymmetric configuration.

3. The device according to claim 2, wherein said end formation defines an air gap of laterally varying dimension.

4. An indicating device, comprising
   a stator having an annual array of magnetic teeth,
   a plurality of electrically energizable coils circumposed about said teeth,
   actuating means for selectively energizing said coils to produce salient poles at angularly spaced locations of a selected polarity,
   a two pole rotor rotatable centrally of said stator and having oppositely extending magnetic poles of opposite polarity whereby one of said magnetic poles having a polarity opposite the selected polarity of said salient pole will align itself with said salient pole, and,
   an asymmetric magnetic formation on each of said magnetic poles defining an asymmetric air gap configuration between one of said magnetic poles aligned with one of said salient poles whereby said aligned pole and said salient pole will remain alinged subsequent to the de-energization of said salient pole and said asymmetric magnetic formation will produce incipient rotation of said rotor only when the polarity on said salient pole is the same as the polarity of said aligned magnetic pole.

5. An indicating device according to claims 1, 2, 3, or 4, said magnetic poles being permanently magnetized magnetically hard material.

6. An indicating device according to claims 1, 2, 3 or 4 wherein said magnetic poles are permanently magnetized of a magnetically hard material with magnetically soft end portions.

7. An indicating device according to claims 1, 2, 3, or 4, wherein said asymmetric magnetic formations comprise wedge-shaped end portions on said magnetic poles for defining a wedge-shaped air gap between a substantially aligned pair of magnetic and salient poles.

8. An indicating device according to claims 1, 2, 3, or 4 wherein said asymmetric magnetic formations comprise wedge-shaped end portions on said magnetic poles which extend diagonally outwardly from opposite poles for rotary balance of said rotor.

References Cited

UNITED STATES PATENTS

| 3,221,191 | 11/1965 | Cuches et al. | 335—268 |
| 3,118,138 | 1/1964 | Milas et al. | 335—281 |
| 3,089,131 | 5/1963 | Morgan | 335—229 |

BERNARD A. GILHEANY, Primary Examiner

D. M. MORGAN, Assistant Examiner

U.S. Cl. X.R.

310—49; 335—268, 272; 340—378.